Jan 6, 1931.  E. WILDHABER  1,787,768
AUTOMATIC TRANSMISSION
Filed March 26, 1928  5 Sheets-Sheet 2
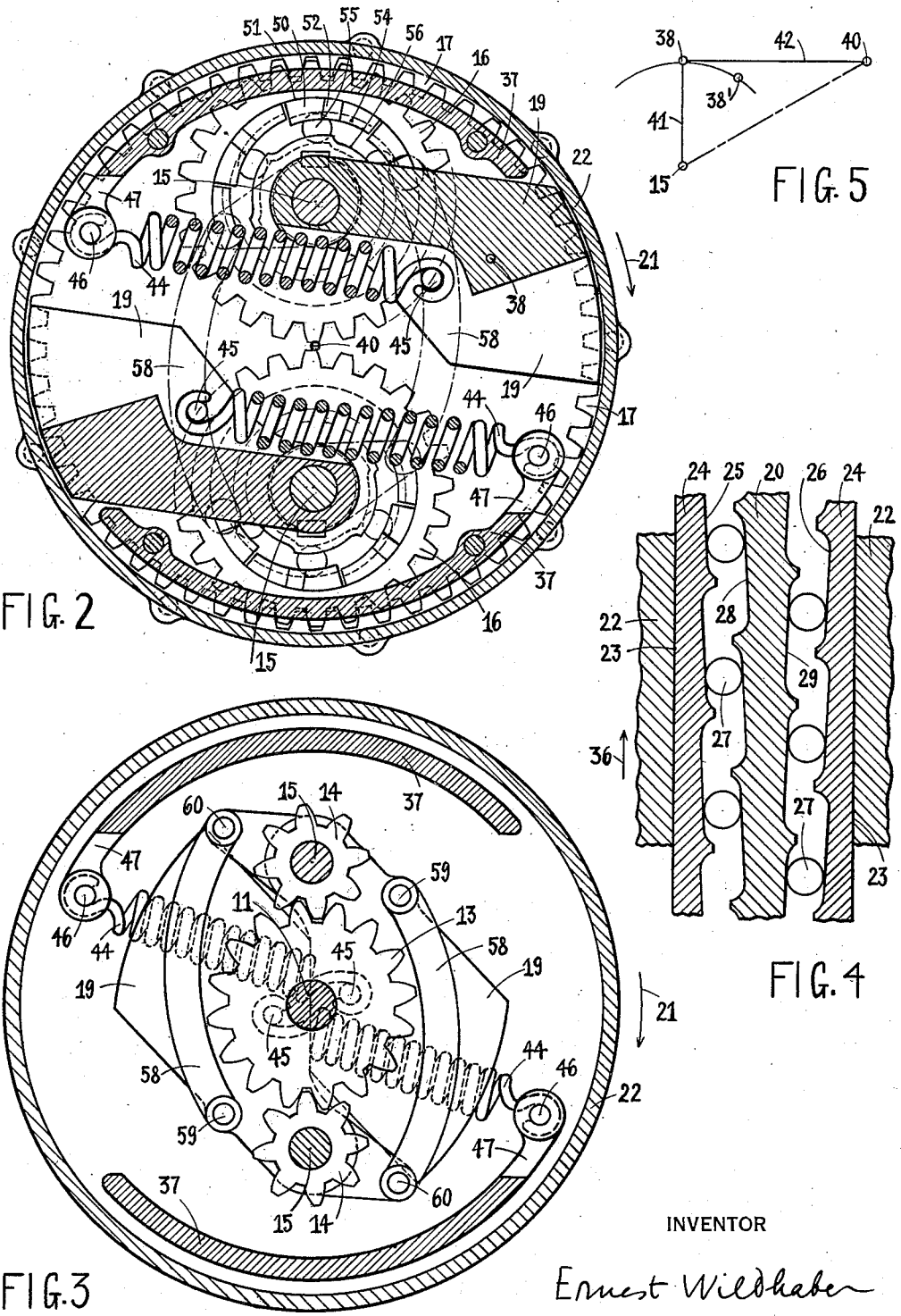
INVENTOR
Ernest Wildhaber Jan 6, 1931. E. WILDHABER 1,787,768
AUTOMATIC TRANSMISSION
Filed March 26, 1928 5 Sheets-Sheet 3

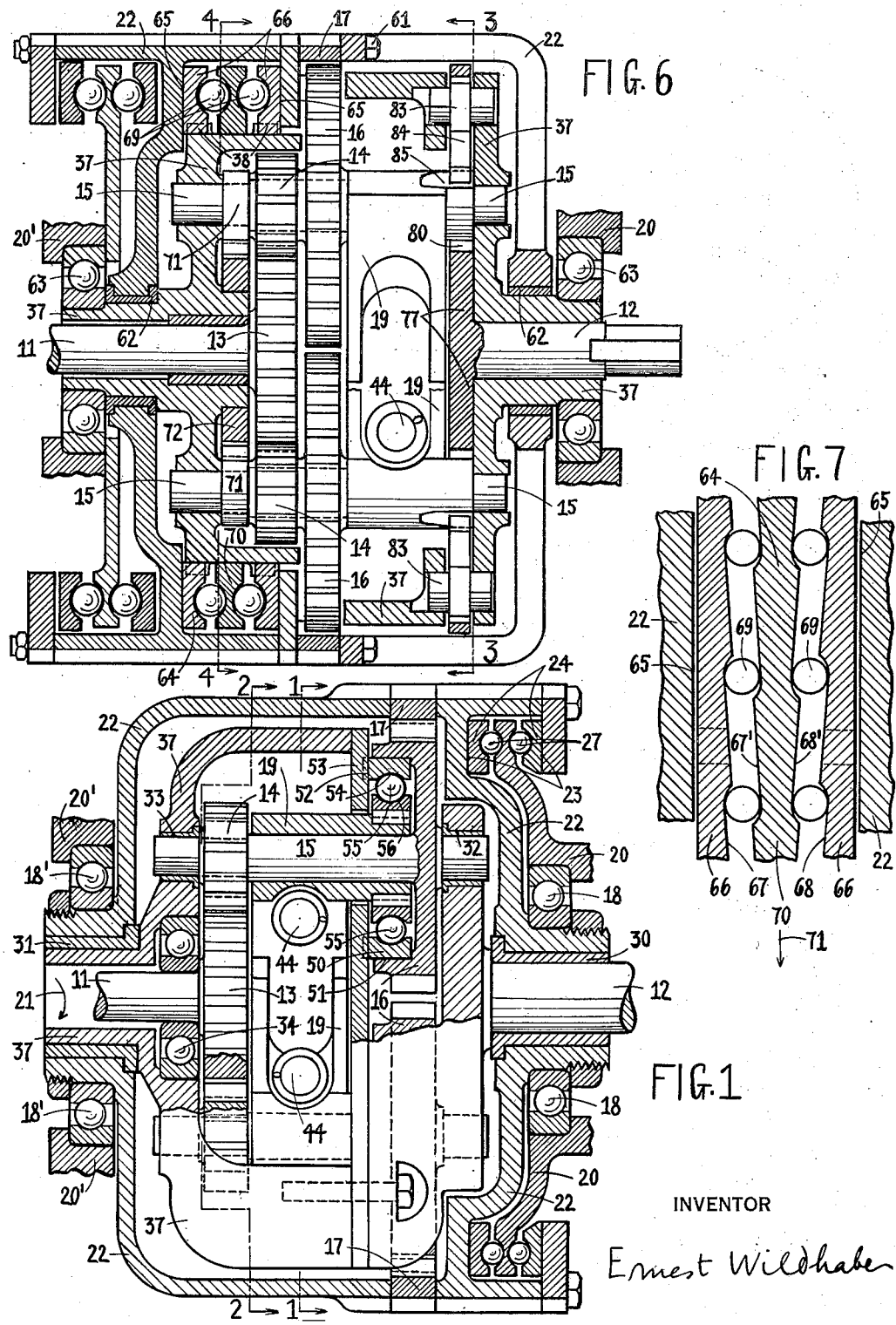

INVENTOR
Ernest Wildhaber

Jan 6, 1931. E. WILDHABER 1,787,768
AUTOMATIC TRANSMISSION
Filed March 26, 1928 5 Sheets-Sheet 5

INVENTOR
Ernest Wildhaber

Patented Jan. 6, 1931

1,787,768

UNITED STATES PATENT OFFICE

ERNEST WILDHABER, OF BROOKLYN, NEW YORK

AUTOMATIC TRANSMISSION

Application filed March 26, 1928. Serial No. 264,684.

The present invention relates to automatic transmissions and particularly to automatic transmissions for use in automotive vehicles.

One object of the present invention is to provide an automatic transmission, which automatically sets in operation different ratios between a driving member and a driven shaft, in correspondence with the transmitted torque and with the speed of the vehicle.

Another object of the present invention is to provide an automatic transmission whose operation depends on the retardation and acceleration of a vehicle. A still other object is to provide a safety transmission which prevents stalling of the engine on up grades or on railroad tracks.

Another important object is to provide an automatic transmission whose operation depends on the amount of torque transmitted while nevertheless the operation is independent of the direction of the torque, that is to say independent of whether the motor drives the car wheels, or whether the said wheels drive the motor when going down hill.

A further object is to provide an automatic transmission which furnishes reliable gear reductions.

A still further object is to provide an automatic transmission whose operation depends on the speed of a car and at the same time on the amount of torque transmitted, but not on the direction of said torque.

Another aim is to provide a novel transmission which operates direct drive and intermediate gear automatically, and in which low gear and reverse gear are operated by hand.

A still other purpose is to provide a novel automatic transmission whose operation depends on the position of a weight which may swing a given angle about an axis parallel to the axis of the drive shaft, and a transmission which operates practically without friction loss also immediately before and after the ratio is being changed.

Further objects will be apparent in the course of the specification and from recital of the appended claims.

My invention is exemplified in the accompanying drawings, in which:

Fig. 1 is an axial section, partly a view, of one form of automatic transmission constructed in accordance with the present invention.

Fig. 2 is a section along lines 1—1 of Fig. 1, the shown position of the centrifugal weights corresponding to direct drive.

Fig. 3 is a section along lines 2—2 of Fig. 1. The position of the centrifugal weights indicated in Fig. 3 corresponds to a gear reduction.

Fig. 4 is a partial and diagrammatic development of the circumference of a brake which is operative in one direction only, and which forms part of the embodiment illustrated in the Figures 1 to 3.

Fig. 5 is a diagram illustrative of centrifugal weights having proportions other than those incorporated in the embodiment of the Figures 1 to 3.

Fig. 6 is an axial section, partly a view of another embodiment of the present invention, illustrative of certain refinements hereafter referred to.

Fig. 7 is a partial and diagrammatic development of the circumference of a friction clutch, which forms part of the embodiment shown in Fig. 6.

Fig. 16 is a front elevational view, partly a section of means for operating by hand a transmission of the character shown in the Figures 12 to 15. The said means are shown somewhat diagrammatically.

Fig. 17 is a plan view corresponding to Fig. 16, and partly a section along lines 8—8 of Fig. 16.

Fig. 18 and Fig. 19 are diagrams of templets forming part of the means shown in Fig. 16 and Fig. 17. The Figures 18 and 19 illustrate two slightly different ways of locking the automatic part of the transmission during operation of the transmission by hand.

Figure 8:
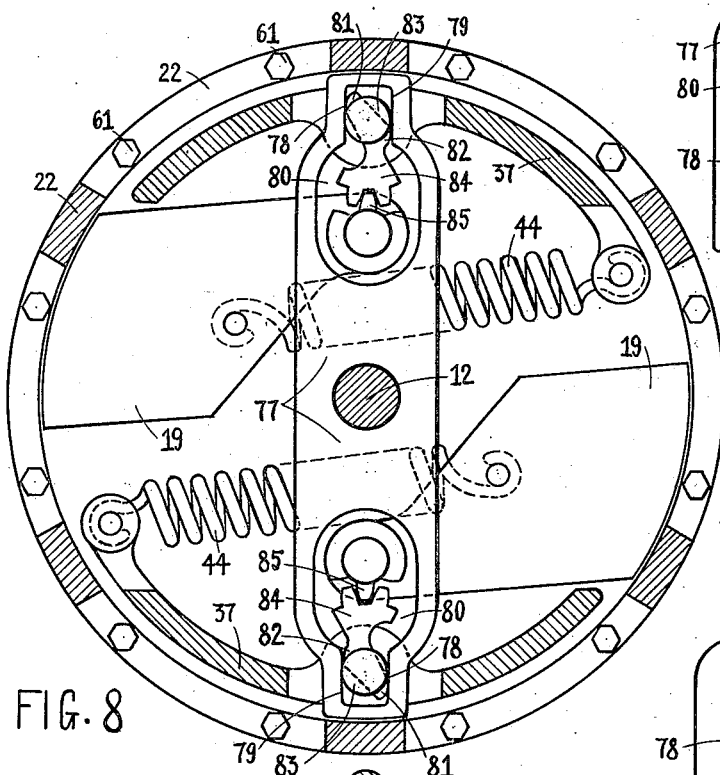
Fig. 8 is partly a view, partly a section along lines 3—3 of Fig. 6.

The embodiment of my invention indicated in the Figures 1 to 3 provides two different ratios, namely direct drive and a reduction corresponding about to intermediate gear of known three speed transmissions. This embodiment is employed preferably in combination of a simple transmission of known type, or in combination with other known means for effecting low gear and reverse gear.

Before explaining the automatic features of the present embodiment, the gearing means will be briefly explained.

The drive shaft 11, which receives power from a motor, is in alignment with the driven shaft 12, and connected with it through planetary gearing. The said gearing consists of a gear 13 forming part of the drive shaft 11, of planetary pinions 14 mounted on planetary shafts 15, of planetary gears 16 forming part of shaft 15, and of an internal orbit gear 17. The driven shaft 12 forms part of the planet carrier, that is to say part of the casing, in which the planetary shafts 15 are journalled.

Internal gear 17 is bolted to and forms part of a casing 22, which is journalled on stationary portions 20, 20' by means of ball bearings 18, 18'. The planet carrier is journalled in casing 22 by means of bearings 30, 31. The planets themselves are journalled in the planet carrier on bearings 32, 33, and the drive shaft 11 is journalled on a bearing 34 of the planet carrier, and on another bearing outside of the illustrated part of the drawing.

In direct drive the planetary gears are locked and the planetary gearing turns around as a solid unit, so that the drive shaft 11 and the driven shaft 12 are then directly connected. When the gear reduction is in operation, gear 13 imparts motion to the planetary pinions 14, which in turn transmit their motion to the planetary gears 16, rigidly connected with said pinions. The gears 16 roll on internal orbit gear 17, which is then held stationary, and impart slow motion to the planet carrier and to driven shaft 12.

Direct drive is operated through centrifugal weights 19, which are pivoted on shafts parallel to drive shaft 11, and which are pivoted in the present case on the shafts 15 of the planetary gears. As a weight swings out to a position where its center of gravity has a maximum distance from the center (40) of the planetary gearing, it operates a clutch or brake which prevents relative motion of the planetary gears, in other words which locks the planetary gearing.

When the said clutch or brake is disengaged, so that the planetary gears may freely turn on their axes, gear reduction is effected by maintaining internal orbit gear 17 stationary, as follows: Internal gear 17 is connected with a stationary projection 20 by means of an overrunning clutch or a one way brake, that is to say by a brake which prevents reverse motion of internal gear 17, but permits entirely free motion of said gear in forward direction. Such a one way brake does not oppose rotation in direction of arrow 21 (Fig. 2) of the planetary gearing as a whole.

Suppose that the drive shaft 11 continues to turn in direction of arrow 21, and that now the planetary gears are free to turn on their axes. As the driven shaft 12 tends to slow up and to stand still, the internal gear 17 will tend to assume a rotation in backward direction, that is to say in a direction opposite to arrow 21, owing to the drive through gear pairs 13, 14 and through gears 16. This tendency of gear 17 to turn backwards is prevented by the said one way brake. Gear 17 actually comes to a standstill, and the planet carrier and the driven shaft 12 are moved forward at a reduced rate, as the planetary gears 16 roll on the stationary internal gear 17. In this manner positive slow motion may be transmitted to the driven shaft, as long as the motor drives the car and transmits positive torque to the wheels of the car.

A one way brake of a character as may be conveniently used will now be described. The rotary casing 22, of which gear 17 forms a part, contains two ring shaped plane sides 23, which face each other. Rings 24 are suited to contact with said plane sides. On the sides opposite to said contact the rings contain helicoidal grooves 25, 26 (Fig. 4) in which balls 27 are provided. Balls 27 contact with other helicoidal grooves 28, 29 of equal hand and equal inclination as the grooves 25, 26 respectively. The said grooves 28, 29 are provided on a stationary projection 20. The action of this one way clutch will best be understood from consideration of Fig. 4, which is a partial development of a sectional cylindrical surface laid through the balls 27 coaxial with the main axis (40) of the transmission. In Fig. 4 an engaged position of the one way brake is indicated. Whenever casing 22 and sides 23 have a tendency to go backwards, in the direction of arrow 36, the friction between sides 23 and rings 24 will also move said rings somewhat in the direction of arrow 36 relatively to stationary projection 20. On account of the inclination of the grooves 25, 26, that is to say on account of the helicoidal nature of said grooves, such relative motion will tend to further separate the outward sides of rings 24, so that they contact with increased pressure with the sides 23. It is noted that the balls 27 roll in the helicoidal grooves 25, 26, 28, 29 during relative motion as described, so that said relative motion between rings 24 and projection 20 is effected with a minimum of friction. A very large pressure may be effected on the sides 23, the pressure being the larger, the less the helicoidal grooves are inclined to the circumference of the rings 24. Sides 23 and casing 22 are therefore promptly locked to the stationary projection 20 at every tendency to move backwards.

The action of the centrifugal weights 19 will now be described. A weight 19 is preferably pivoted in the planet carrier 37 on an axis parallel to the main axis (40) of the transmission, that is to say parallel to the common axis of the drive shaft 11 and driven shaft 12. In the case illustrated, a weight 19 is pivoted on the shaft 15 of a planetary gear. The main mass of weight 19, and its center of gravity 38 is angularly displaced in the direction of forward motion as compared with the axis 15 of the weight, see Fig. 2, where arrow 21 denotes the direction of forward motion. With the proportions indicated, weight 19 is not only sensitive to the speed of rotation of the planet carrier 37, but also to its acceleration. In other words, weight 19 is drawn outward through the centrifugal force and in addition tends to fall back and therefore to move outward, when the speed of the planet carrier starts to increase. Both forces are due to the inertia of the weight, as is well known: The centrifugal force depends alone on the speed, whereas the other force depends only on the rate of the change in speed, and not on the amount of speed or the velocity.

The proportions are so selected, that acceleration has the same effect as high angular velocity, that is to say that acceleration tends to move the weights 19 towards the outside. Retardation or reduction of speed on the other hand tends to draw the weights in, towards the center of the transmission. The utilization of acceleration and retardation contributes materally to effect prompt changes of ratio in case of need.

The weights 19 may be disposed in such manner that acceleration tends to move the weights outwardly, with forces of desirable magnitude, with the use of the known laws of mechanics. In such exceptional cases, where the inertia of the weights 19 is undesirable, proportions may be selected as indicated in the diagram Fig. 5. In Fig. 5 the numeral 40 denotes the main axis of the transmission, 15 the pivot of the weight (19) and 38 its center of gravity. When it is imagined that the whole mass of the weight can be concentrated in its center of gravity 38, then acceleration will have no effect on the weight, when line 41 passes through pivot 15. Line 41 is herein perpendicular to radius 42.

More accurately, acceleration will have no effect, when the center of gravity is located somewhat to the inside of point 38, towards the side of point 38'. The exact position can be accurately computed with the known means of mechanics. Centrifugal weights having a mean position as described, and having end positions on either side of said mean position equally distant from it, are found to be practically independent of acceleration.

I have described this case with some details, because it also constitutes a limit of the preferred structures, in which acceleration plays the part specified.

The weights 19 are continuously drawn towards the center of the transmission by means of tension springs 44, which are attached on one end to pins 45 secured to the weights 19. On their other ends the springs are held by means of pins 46, which are provided in suitable projections 47 of the planet carrier 37. As the weights move, the center lines of the springs are maintained continuously in a plane perpendicular to the main axis (40) of the transmission, that is to say to the common axis of the shafts 11 and 12. It is also noted from consideration of Fig. 2 and Fig. 3 that the center line of a spring is offset a smaller amount from the pivot of a weight when the weight is in its outside position (Fig. 2), as compared with the inside position of the weight (Fig. 3). Hence the leverage of a spring is smallest when the spring is longest and when therefore the spring exerts a maximum tension. With this provision it is found possible to more completely utilize the energy stored up in a spring and to effect other advantages.

Suitable recesses are provided on the weights 19 for the springs 44.

Preferably the springs are so positioned and dimensioned that equilibrium between the spring forces and the centrifugal forces acting upon the weights 19 is effected only in the end positions or adjacent the said end positions of the weights. This is noted to be in contradistinction with the usual practice in selecting and positioning springs of centrifugal governors. In the latter case the springs are ordinarily so selected and positioned relatively to centrifugal weights, that stable equilibrium is possible in all positions of the weights.

In the present case a weight once started from one of its two end positions, will move directly to the other end position (or to a position adjacent said end position) and not come to rest in intermediate positions. Proportions are namely so selected that a force which starts a weight to move in one direction, will grow as the weight moves in that direction. The motion is therefore maintained with increasing force, and ceases only when coming to a stop, that is to say when an end point is reached.

The object attained in providing what might be termed unstable conditions of equilibrium is to prevent loss of energy through friction, to prevent heating up through friction, and to effect other aims through which the present structure differs from established centrifugal governors. In the present case it is desirable to effect either direct drive, or to run in gears, but it is very undesirable to maintain a drive for any substantial time, which is composed of a direct drive and of a gear action. When a direct drive acts simultaneously with a gear reduction, the frictional contact effecting the direct drive component is naturally made under much slippage, with the consequent loss of energy and creation of heat. Conditions such as these could occur in intermediate positions of the weight 19, and the described provisions prevent therefore such conditions from enduring.

In their outside position (Fig. 2) the weights 19 lock the planetary gearing by preventing the planetary gears 16 from turning on their axes 15. In other words the weights 19 operate a clutch or brake, which connects gears 16 with the planet carrier 37. The clutch or brake shown consists of a plurality of segments 50 (Fig. 1 and Fig. 2), which contact on the outside with a hollow cylindrical surface 51 of a gear 16. Segments 50 contain projections 52 engaging slots provided in a disk 53, which forms part of the planet carrier 37. Projections 52 prevent the segments 50 from rotating with a gear 16, and permit motion of said segments radially towards and from shaft 15. The segments 50 contain on their inside grooves 54, which are operatively connected through balls 55 with other grooves 56. The latter are disposed on a disk which is keyed to the hub of a weight 19. The grooves 54 and 56 extend lengthwise along circular arcs drawn from the same centers respectively, and are so disposed, that outward motion of the weights 19 corresponds to outward motion of the segments 50 in the direction of the respective radial slots. When the weights 19 are in their outside end position, or adjacent such position, the segments 50 are pressed like brake shoes on cylindrical surface 51 of the gears 16, and thus lock the gears 16, and with them the whole planetary gearing. The planetary gearing then turns around as a solid unit. As the weights 19 move inwardly the pressure on segments 50 is released, and the gears 16 are given free. Preferably the segments are drawn inwardly and away from frictional contact by springs which are not shown in the drawing.

At certain small speeds the individual weights have a tendency to wabble under the influence of gravity, which tends to move the weights alternately inwardly and outwardly, and in either direction once per revolution of the planet carrier. In such moments the weights would be a nuisance, unless counter balanced. According to the present invention the weights 19 are counter balanced by being operatively connected with each other. The operative connection is effected by parallel linkage, that is to say by connecting rods 58 attached to points 59, 60 of the weights. Although the connecting rods 58 are curved to prevent interference, their action is the same as if they were straight. For convenience the rods 58 are omitted in Fig. 1. With the shown operative connection, which equalizes the motion of the two weights 19, the tendency of one weight to swing is counterbalanced by the tendency of the other weight to swing oppositely. As a result a very smooth action is obtained.

The operation of the transmission is as follows:

At low speed of the vehicle and of the driven member 12, the forces exerted by the springs 44 exceed the centrifugal forces of the weights 19 and maintain the weights in their inner end position or central position. The clutch or brake between a gear 16 and the planet carrier 37 is then disengaged, and the planetary gears are free to turn on their axes. As they do, internal gear 17 has a tendency to move backward, and is then held stationary through the action of the one way brake described. A gear reduction is thereby provided and increased torque is applied to the driven shaft. A short analysis shows, that internal gear 17 continues to be pressed backwards with a torque equal to the difference between the increased torque of the driven shaft and the torque of the drive shaft.

As the speed of the vehicle and of driven shaft 12 increases, the centrifugal force and the inertia due to acceleration will overcome the resistance of the springs 44 and start the weights 19 to move outwardly. As they move, the turning moment exerted upon the weights by the centrifugal force grows more than the opposing turning moment of the springs 44. The weights 19 will arrive therefore in an outside position with sufficient power to completely lock the planetary gearing in the manner described. Internal gear 17 and casing 22 then also tend to move forward and are therefore released by the one way brake. The vehicle then operates in direct drive.

At low speed, the transmission automatically releases the locking mechanism and provides a gear reduction. When a car moves up grade or starts to cross a railroad track, the car slows up, either through the increased resistance or by will. As it does so the weights 19 are drawn inwardly by the springs 44. When a car slows up suddenly, the weights respond to the retardation much quicker than they would to low speed, and promptly let the transmission change to gear reduction. The change of gear ratio is automatically effected long before a motor could come to a point of breaking down.

A modification of my invention, and a refinement of it, will now be explained with reference to the Figures 6 to 11.

One main point of difference between this embodiment and the already described one is the feature, that in this embodiment the automatic operating means depend also on the torque transmitted to the driven shaft.

In the Figures 6 to 11, the numeral 11 and 12 again denote a drive shaft and a driven shaft respectively. Moreover the shown gear connections proper are substantially the same, and consist of a gear 13 forming part of drive shaft 11, planetary pinions 14 meshing with gear 13, planetary gears 16 integral with pinions 14, and an internal orbit gear 17 in mesh with planetary gears 16. Internal gear 17 forms part of a casing or cage 22, the different parts of said casing being bolted together by screws 61. Casing 22 is journalled on the planet carrier 37 by means of two bearings 62. The planet carrier is journalled on stationary portions 20, 20' by means of ball bearings 63. The planetary pinions 14 and planetary gears 16 contain a common hub suited to turn on a pivot 15 which is integral with or is rigidly secured to weights 19. The weights are disposed as previously described with reference to Fig. 2, with their centers of gravity angularly advanced in the direction of forward motion, as compared with the pivots 15 of the weights. Springs 44 of the character described continuously draw the weights inwardly, that is to say towards the center of the transmission.

In this embodiment the planet carrier 37 forms also part of the driven member, but is not rigidly connected with the driven shaft 12, as will be further described hereafter.

The planetary gearing is locked for direct drive by means of a clutch 64, which is suited to connect the planet carrier 37 with the casing 22 comprising the internal gear 17. The clutch is again operated by the centrifugal weights 19. In general, any arrangement may be used, which is suited to lock the planetary gearing in correspondence to the position of the weights 19. In principle it is immaterial which parts of the gearing are frictionally connected with each other, and whether the planetary gears are frictionally connected with the planet carrier, or whether the planet carrier is connected with the internal gear 17. Also any suitable known form of clutch may be employed, whether it be of the radial type, as indicated in the Figures 1 and 2, or of the axial type, as the one now being described.

Casing 22 is provided with two plane sides 65 which face each other and which are suited to engage in frictional contact with rings 66. These rings are positively connected with planet carrier 37 by engaging splines 38 of said planet carrier, so that rings 66 are angularly fixed but axially movable with respect to said planet carrier. Reference is further made to Fig. 7, which illustrates a disengaged position of clutch 64. The rings 66 contain a number of helicoidal grooves 67, 68 of opposite hand, which are operatively connected with other grooves 67', 68' through balls 69, the grooves 67, 67' and 68, 68' having equal lead respectively. The grooves 67', 68' form part of ring shaped member 70.

Motion of member 70 in the direction of arrow 71 relatively to rings 66 moves the said rings apart, into contact with the sides 65, and thereby engages the clutch. During such motion the balls 69 roll in the respective grooves 67, 67' and 68, 68', so that relative motion between member 70 and rings 66 takes place with a minimum of friction. If so desired, the rings 66 may be drawn towards each other by light springs, which then assist in maintaining the clutch disengaged in the shown relative position of member 70 and rings 66.

Figure 9:
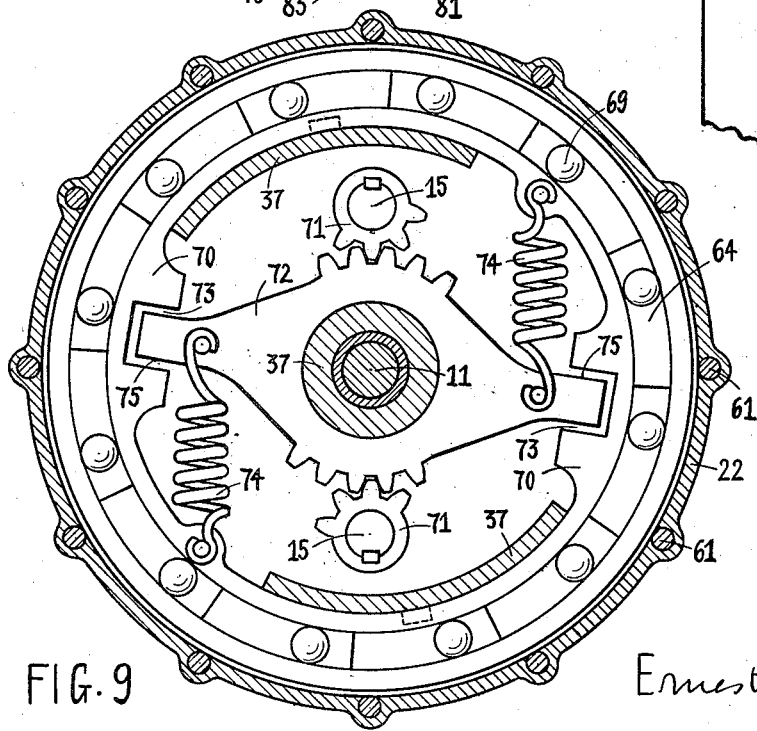
Fig. 9 is partly a view, partly a section along lines 4—4 of Fig. 6.

Engagement and disengagement of the clutch is operated by the weights 19. Reference is now further made to Fig. 9, which corresponds to the outward position of the weights and to engagement of clutch 64. The weights 19 are integral with their pivot 15, which carries adjacent one end a small segment 71 keyed to pivot 15. The segments 71 mesh with teeth provided on a double lever 72, which engages recesses 73 of member 70, ample backlash being provided between lever 72 and member 70. Double lever 72 and member 70 are further connected by means of springs 74. The purpose of this arrangement is to prevent gradual and slow disengagement of the clutch 64, and to assure rapid disengagement, so that no loss of energy and transformation into heat can be kept up.

In any position except full engagement of the clutch, double lever 72 contacts with member 70 with its sides 75, under the tension of springs 74. Considering the process of engagement, contact is maintained on sides 75 until engagement is complete and member 70 cannot further move in clockwise direction, Fig. 9. Proportions are so selected that the weights 19 have then not yet arrived fully at their outward end position. The weights, therefore, move on a little, and with them the lever 72, and contact at the sides 75 ceases. The weights and lever 72 come to a stop in a position of lever 72 substantially as shown in Fig. 9.

Considering now the process of disengagement, it is seen that the clutch is maintained completely engaged, until double lever 72 has moved into contact with member 70 at side 75. When such contact is effected, sufficient force and impact have been gathered in the path from the shown position to the position of contact, to completely disengage the clutch at once.

In this manner an important drawback of known transmissions of the character referred to is done away with.

In a transmission it is generally desirable to provide automatically an increasing gear ratio as the torque increases which is required on the car wheels. In other words it is desirable to provide operating means which are sensitive to the amount of torque transmitted to the driven member. Such means will now be described, and moreover they will be described in a preferred combination, in which they are also sensitive to the speed of the driven member.

In the embodiment previously described, the centrifugal weights 19 were solely under the influence of springs (44), aside of the influence of their own inertia forces. In the present embodiment, the load transmitted to the driven member is also a factor in establishing the position of the weights 19. The driven shaft 12 (see Fig. 8) contains double arms 77, with which it is operatively connected with the weights 19, so that the angular position of shaft 12 relatively to the planet carrier 37 depends on the position of the weights. Shaft 12 is operatively connected with weights 19 by a double reduction: Arms 77 contain sides 78, 79, adjacent a hole 80, and mesh on said sides with teeth 81, 82 respectively, which are integral with small pivots 83, and also integral with segments 84. The latter mesh with teeth 85 provided on the hubs of weights 19, adjacent one end.

When a weight 19 swings from one end position to another, it will through the above said gear connection also move double arms 77 and driven shaft 12 by a small distance. On the other hand motion of shaft 12 relatively to the planet carrier also affects the weights 19. It is readily understood that through the said operative connection the position of the weight is influenced by the load transmitted from the planet carrier to the driven shaft 12, namely by the load transmitted through the teeth 81, 82 to the sides 78, 79. The influence of the transmitted torque may be increased or diminished by suitably changing the ratio between the weights 19 and shaft 12, in a manner as to increase said reduction ratio for diminishing the influence of the torque.

An increased torque has a tendency to operate the larger gear reduction between the drive shaft and the driven shaft. In Fig. 8, an increased torque exerted on the driven shaft and transmitted through teeth 81 and sides 78, tends to let the driven shaft fall back and consequently tends to draw the weights inwardly. Inward position of the weights corresponds to unlocked position of the planetary gearing and to the gear reduction, in which the internal gear 17 is held stationary through the one way brake shown on the left side of Fig. 6. The said brake is alike in principle with the one described with reference to the former embodiment.

It is desirable to provide an increased reduction ratio with increasing torque not only when the motor drives the vehicle, but also on down grades, when the vehicle drives the motor, the motor then acting as a brake.

In known automatic transmissions whose operation depends on the transmitted torque, no provision is made to meet the latter conditions. In such transmissions a torque exerted on down grades through the car wheels on the motor has the automatic tendency to reduce the reduction ratio, that is to say to effect direct drive. In other words while a positive torque tends in a desirable way to increase the reduction ratio, a negative torque tends to reduce said ratio, and therefore tends to do the opposite from what is desired.

According to the present invention a negative torque is made to operate the transmission in the same manner as a positive torque: An increasing torque always tends to increase the reduction ratio, regardless of the direction of the torque. The steeper a down grade, the larger will be the tendency to increase the ratio. This novel feature of the present invention spans a gap of known automatic transmissions and provides a transmission whose automatic operation can really be depended upon.

When the motor transmits torque to the driven shaft 12, contact is effected between a tooth 81 and a side 78, and when torque is transmitted backwards, from the driven shaft to the motor, contact is made between a tooth 82 and a side 79. In considering Fig. 11 it is seen, that the pressure exerted through side 79 on tooth 82 tends to rotate the toothed member on its center 83 in the same (clockwise) direction as the reaction pressure does, which may be exerted through side 78 to tooth 81. The tendencies to turn segment 84 and consequently weight 19 are therefore in the same direction irrespective of the direction of the torque. In gear reductions of conventional character opposite tooth pressures exert opposite turning moments.

The profiles of the teeth 81, 82 may be involutes, or approximately involutes. Tooth pressure is then applied in the direction of the normals shown in dotted lines, which are tangent on opposite sides to a base circle 86.

Figure 10:
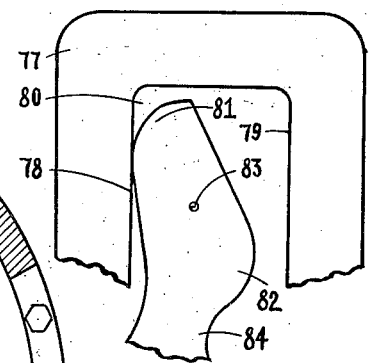
Fig. 10 and Fig. 11 are enlarged views of an important detail of the embodiment indicated in the Figures 6 to 9, the two figures illustrating two different relative positions.
Figure 11:
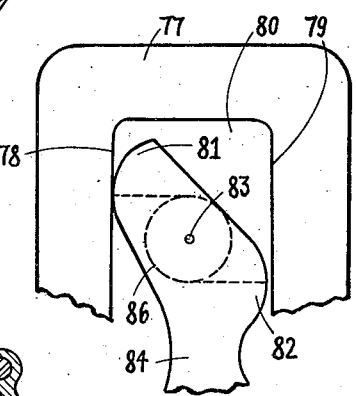

Fig. 11 illustrates a relative position corresponding to the outward position of the weights 19. Little or no backlash exists in this position. Fig. 10 illustrates for comparison a relative position corresponding to the inward position of the weights 19, torque being transmitted from the motor to the driven shaft 12 in either illustrated case. As the segment 84 turns on its center 83, tooth 82 moves somewhat away from side 79, as shown. The slight backlash thereby experienced is found to be harmless in practice.

The operation of an automatic transmission of the character illustrated in the Figures 6 to 11 depends on the torque transmitted to the driven shaft, on the speed of the driven shaft or on the car speed, and on its acceleration and retardation. Acceleration and retardation have the favorable influence already described.

Low car speed and large load effect a gear reduction. High car speed and small load effect direct drive. Gear reduction is further effected at very low car speeds, although the load may be small and at large loads although the car speed may be considerable. Direct drive is maintained at quite high car speeds, although the load may be considerable, and at small loads whenever the car speed exceeds a certain minimum.

Figure 15:
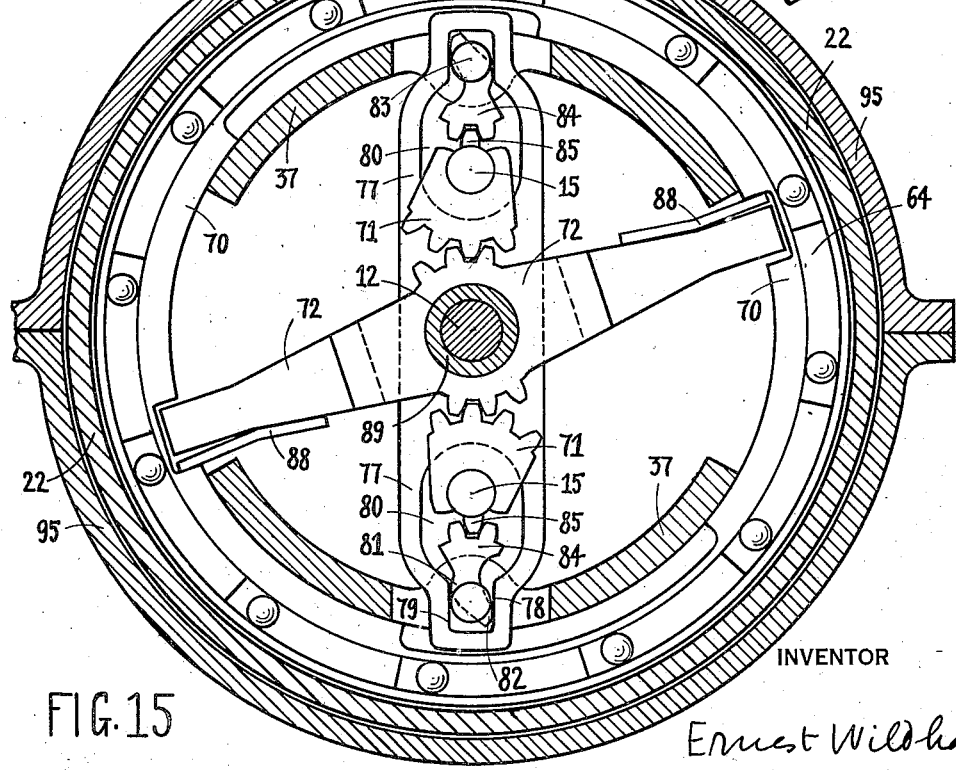
Fig. 15 is partly a view, partly a section along lines 7—7 of Fig. 12.

In the embodiments of my invention so far described two ratios were provided and automatically put into action and out of action. A further preferred embodiment will now be described which contains additional ratios, and which may be used in place of a whole transmission. In this embodiment, Figures 12 to 19, the automatic features remain the same, in principle, as in the embodiments already described. Referring to these figures, the drive shaft 11 is operatively connected with a driven member 12 through planetary gearing. The operation of a part of said planetary gearing is governed by centrifugal weights 19, namely the gear train comprising gear 13 forming part of the driven shaft 11, planetary pinions 14 meshing with gear 13, planetary gears 16 integral with planetary pinions 14, and internal orbit gear 17 meshing with the planetary gears 16. The weights 19 turn on pivots 15, which may be made integral with the weights, if so desired, and which serve also as journals for the planetary gears 14 and 16. The weights are connected with tension springs 44 in the manner already described, and are drawn towards the center of the transmission through said springs and moved outwardly through centrifugal force. In their outward position, the weights maintain a clutch 64 in engagement, which is of the character described with reference to Fig. 7, and which connects the internal gear 17 with the rings 66 keyed to the planet carrier 37. The operative connection between the weights 19 and clutch 64 can best be seen in Fig. 15. Toothed segments 71 of weights 19 mesh with teeth of a double lever 72 which engages two slots of ring member 70 of clutch 64. The width of segments 71 (Fig. 15) is made such, that assembly through the holes 80 is possible. It is also noted that the levers 72 engage the slots of ring member 70 with backlash, and that an operative connection is effected through springs 88. Double lever 72 contains a long hub 89, which is suited to transmit the motion of said lever, and therefore also the motion of weights 19 to the outside of the planet carrier. Hub 89 contains two straight slots 90, engaging with internal projections 91 of a sleeve 92. On the inside said projections engage with helical splines 93 of the driven shaft 12. Sleeve 92 may be axially moved from the outside by hand, for instance with a known lever 93.

When sleeve 92 moves axially it is also rotated on its axis, on account of its engagement with the helical splines 93 of shaft 12. Through its engagement with the slots 90 of hub 89, the sleeve 92 transmits rotation to double lever 72 and hence to the weights 19. On the other hand, an angular motion of the weights 19 also moves the sleeve 92 in axial direction.

Figure 12:
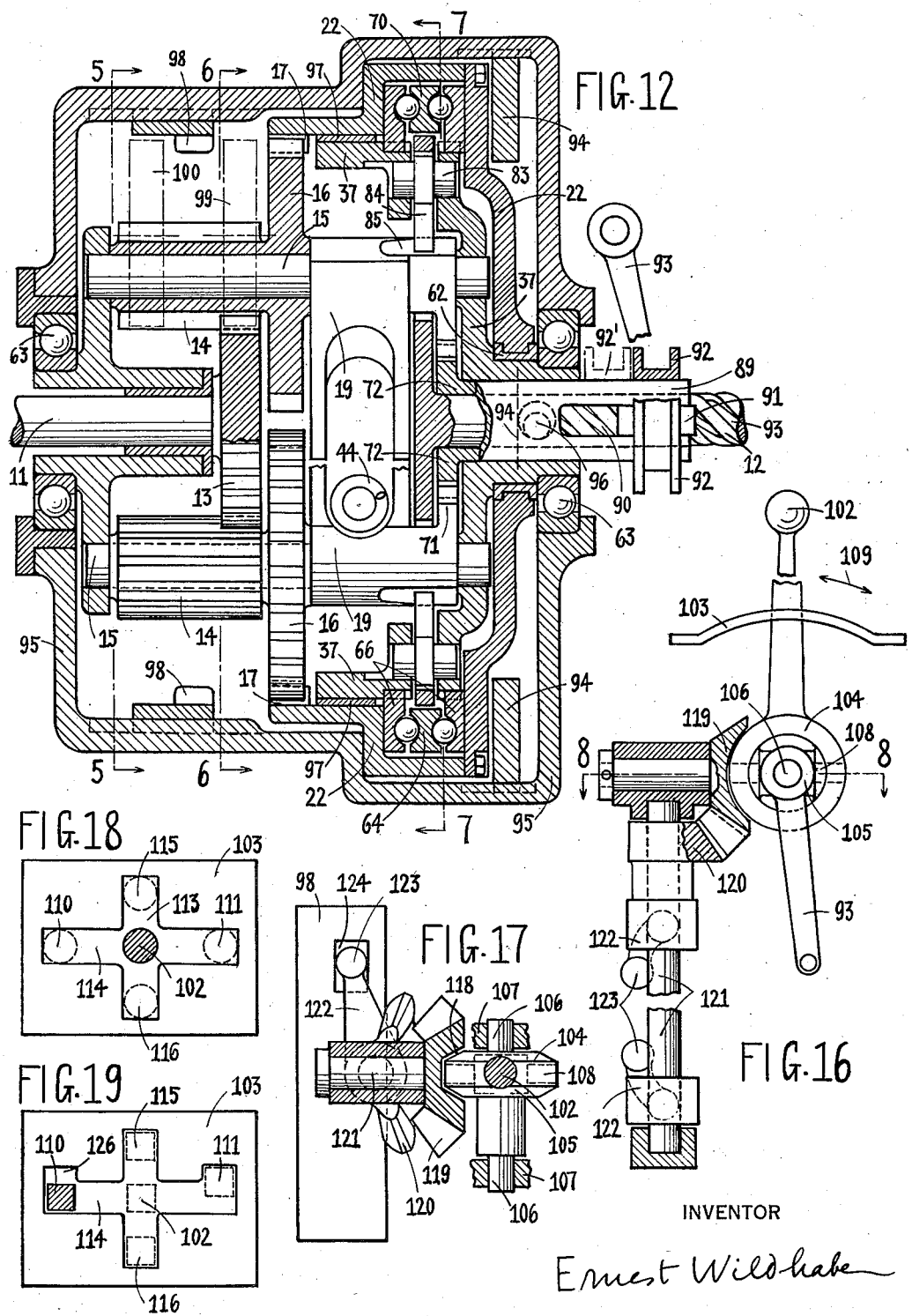
Fig. 12 is an axial section of an embodiment of the present invention, which is a combination of elements operated automatically and of elements operated by hand.
Figures 13, 14:
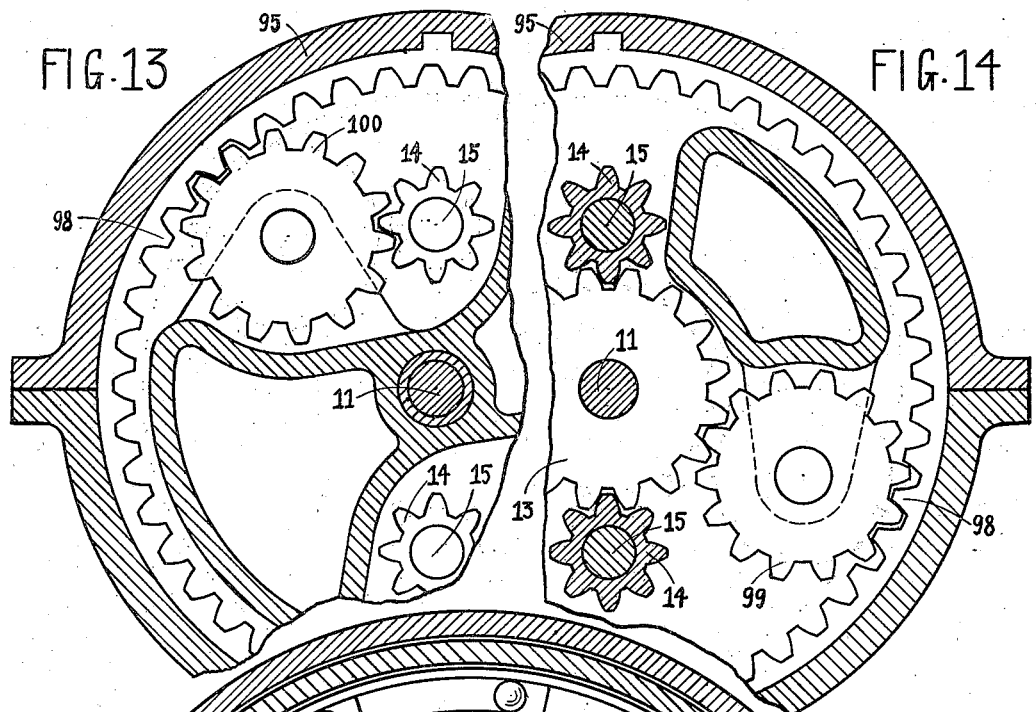
Fig. 13 and Fig. 14 are partial views and sections along lines 5—5 and 6—6 of Fig. 12 respectively.

The position of sleeve 92 shown in full lines in Fig. 12 corresponds to engagement of clutch 64. The position shown in dotted lines 92' corresponds not only to disengagement of clutch 64, but also to engagement of a brake through outside means. The said brake is suited to hold internal orbit gear 17 stationary, by pressing disk 94 to the left (Fig. 12) along splines provided in the stationary housing 95, so that the internal gear is held solid with said housing. The operation of this brake is indicated only diagrammatically: The brake may be operated with an eccentric 96, which exerts pressure on the plane side of disk 94. Eccentric 96 is operatively connected by means not shown with lever 93 and with sleeve 92.

The planet carrier 37 forms part of the driven member, but is not rigidly connected with the driven shaft 12. The operative connection between the planet carrier 37, the weights 19 and driven shaft 12 is in principle the same as in the embodiment described with reference to the Figures 6 to 11.

The weights 19 act with teeth 85 on the teeth of a segment 84, which can turn by small angles on pivots 83. Two teeth 81, 82 are integral with segment 84 and act on the sides 78, 79 of a double arm 77 in the manner described with reference to Fig. 8. Arm 77 is integral or forms part of driven shaft 12, which in the present case contains the helical splines 93 already referred to.

The operative connection described permits a slight angular displacement of the driven shaft 12 with respect to planet carrier 37, in correspondence with the position of the weights 19, and has the purpose of making the control of the gear ratio of the transmission also dependent on the amount of torque transmitted. As in the example previously explained the said control is independent of the direction of the torque.

The casing 22, which is rigidly connected with internal gear 17, is journalled on the planet carrier 37 by means of a bearing 62 of small diameter, and a bearing 97 of large diameter. The planet carrier 37 itself consists of a suitable number of parts, which are rigidly secured together in any desirable known manner.

Additional gear ratios, such as low gear and reverse gear are provided as follows: An internal orbit gear 98 is angularly fixed to but axially movable along splines of the stationary housing 95. In Fig. 12 orbit gear 98 is shown in neutral position. It may be shifted axially to the right and to the left, with known means of gear shifting. When shifted to the right, orbit gear 98 enters into mesh with planetary gears 99, of which one is indicated in dot and dash lines in Fig. 12. The gear train thus put in operation can best be seen in Fig. 14. Motion is applied from gear 13 of the driving shaft 11 to the planetary gears 99, which are in constant mesh with gear 13. Gears 99 roll on the stationary orbit gear 98, at low forward speed, and move the planet carrier 37 along with them. When shifted to the left, Fig. 12, internal orbit gear 98 enters into mesh with the planetary gears 100, of which one is also indicated in dot and dash lines in Fig. 12. An end view of this gear combination is afforded by Fig. 13. Gears 100 are in constant mesh with planetary pinions 14, which in turn receive motion from sun gear 13. When the planetary gears 100 roll on the stationary orbit gear 98, they impart slow reverse motion to the planet carrier 37 and to the driven shaft 12.

The expression drive shaft or driving member is used in the present specification with the meaning that the said shaft (11) or member is the one connected most directly with a motor. And the term driven shaft or driven member is used to designate the member of the transmission connected most directly with a power consumer, such as a rear axle. Generally torque is transmitted from a motor first to the drive shaft or driving member, and leaves the transmission through the said driven shaft or driven member. The terms should however not imply that torque may not be transmitted in opposite direction. Occasionally, namely on down grades of sufficient steepness, the motor will consume torque rather than produce it, and torque is then transmitted from what is called the driven member to what is called driving member.

When low gear or reverse drive are in operation, that is to say when gear 98 is shifted either to the right or to the left of the position shown in Fig. 12, it is important to maintain the clutch 64 disengaged, as well as the brake for holding orbit gear 17 stationary. According to the present invention, a single lever is provided for operating the said gear ratios, and for simultaneously maintaining clutch 64 and said brake disengaged. This will now be further explained with reference to the Figures 16 to 19, which illustrate the principle involved. The dimensions shown do however not directly apply to the embodiment described with reference to Fig. 12 to Fig. 15.

Lever 102 is suited to be displaced by hand and is guided by a templet 103, a diagrammatic plan view of which is shown in Fig. 18, and in a slightly modified embodiment in Fig. 19. Lever 102 has a ring shaped end 104 through which passes an extended hub 105 of a lever 93. The said hub contains cylindrical projections 106, with which it is journalled on stationary portions 107, see Fig. 17. Hub 105 is connected with the ring shaped end 104 by means of a pin 108, which passes through the ring shaped end 104 and through hub 105, and which permits angular motion of lever 102 about the center of said pin.

Lever 102 may therefore be swung about two axes, about the axis of hub 105 and about the pin 108. When moved in the direction of arrows 109, Fig. 16, it operates lever 93. In Fig. 18 the lever 102 is indicated in neutral position with full lines. When said lever is in the position 110 shown in dotted lines (Fig. 18), the position of lever 93 and of sleeve 92 is equal to the position shown in full lines in Fig. 12. Lever 93 and sleeve 92 are operatively connected in known manner. When lever 102 is in the position 111 (Fig. 18) indicated also in dotted lines, then the position of sleeve 92 corresponds to the dash and dot lines of Fig. 12. In other words in position 111 of lever 102 (Fig. 18) the internal orbit gear 17 is held stationary; and in position 110 of lever 102 the clutch 64 is engaged and effects direct drive.

From the above description it is noted that the clutch 64 and the brake for locking orbit gear 17 can also be operated by hand.

To disengage clutch 64 and said brake, lever 93 is brought into neutral position, and moreover may be moved in the transverse slot 113 of templet 103 without affecting the position of lever 93. Motion of lever 102 in slot 113 corresponds to swinging on pin 108. Slot 113 is suited to block automatic operation, and to take up any forces, which might tend to draw the lever 102 either towards position 110 or towards position 111. No force or only small forces are necessary to maintain lever 102 in neutral position, after it has entered slot 113, although the forces tending to dislocate it in the direction of lengthwise slot 114 may be considerable.

Motion of lever 102 along slot 113 is used according to the present invention also for shifting internal orbit gear 98, that is to say for effecting low gear and reverse drive. The position of lever 102 indicated in dotted lines 115 corresponds to low gear and the position indicated in dotted lines 116 corresponds to reverse drive. Ring shaped end 104 of lever 102 engages a slot 118 of a bevel gear segment 119, which meshes with another bevel gear segment 120. The latter is keyed to a vertical shaft 121, to which also two levers 122 are fastened. The latter contain spherical ends 123, with which they engage suitable holes or slots 124 provided in the body of internal gear 98. When the levers 122 are turned on shaft 121 in clockwise direction, they move internal orbit gear 98 into mesh with the planetary gears 99 and thereby effect low gear. When the levers are turned in counter clockwise direction, they move internal gear 98 into mesh with planets 100 and thereby effect reverse gear.

It is noted that motion of lever 102 in slot 113 does not affect the position of lever 93, and that the latter is maintained positively locked in neutral position. The governing means consisting of the weights 19 are hereby also maintained positively locked. On the other hand motion of lever 102 in lengthwise slot 114 does not affect the position of segment 119 and of orbit gear 98. Ring shaped end 104 of lever 102 may turn in slot 118 and yet maintain segment 119 positively in neutral position, and with it also orbit gear 98.

Lever 102 may be kept in an end position 115 or 116 with known elastic means, which are suited to exert small forces sufficient to prevent lever 102 from moving under the influence of eventual vibrations.

The templet indicated in Fig. 19 differs from the templet shown in Fig. 18 by containing means for locking lever 102 also in the two end positions 110 and 111. These means consist in transverse extensions 126 of slot 114, in which the lever 102 may be securely held.

Various modifications may be made in my invention without departing from its spirit. For definition of its scope it is relied upon the appended claims.

What I claim is:

1. In an automatic transmission, a planetary train, a centrifugal weight pivoted on an axis parallel to the main axis of the planetary train, the center of gravity of said weight being angularly advanced in the direction of forward motion relatively to its axis, a spring positioned in a manner as to draw said weight towards said main axis, and a friction clutch for locking said planetary train, said friction clutch being operatively connected with said weight.

2. In an automotive planetary transmission, change speed means for effecting direct drive, intermediate gear reduction, low gear reduction, and reverse drive, governing means for automatically controlling the operation of said direct drive and of said intermediate gear reduction, means for controlling said low gear reduction and said reverse drive exclusively by hand, and a single lever for operating said last named means and for simultaneously and positively locking said governing means.

3. In an automatic transmission, a driving member and a driven member, a planet carrier forming part of the driven member, a train of gears for operatively connecting said driving member and said driven member, a friction clutch for locking said train, a centrifugal weight movable in a rotating path to different distances from the axis of the driven member, said path being disposed at an angle to a plane containing said axis and intersecting said path, so that acceleration of the driven member tends to move said weight in said path, and an operative connection between said centrifugal weight and said friction clutch for controlling said friction clutch with said centrifugal weight.

4. In an automatic transmission, a driving member and a driven member, a planet carrier forming part of the driven member, a train of gears for operatively connecting said driving member and said driven member, a friction clutch for locking said train, means for automatically operating said friction clutch, a centrifugal weight pivoted on a planetary axis angularly disposed to a plane perpendicular to the axis of the driven member, said axis being so positioned relatively to said weight that acceleration of the driven member tends to move said weight about said axis, and an operative connection between said centrifugal weight and said friction clutch for controlling said friction clutch with said weight.

5. In an automatic transmission, a driving member and a driven member, a planet carrier forming part of the driven member, a train of gears for operatively connecting said driving member and said driven member, a friction clutch for locking said train, means for automatically operating said friction clutch, a centrifugal weight pivoted on an axis parallel to the axis of the driven member, for controlling said means in a manner depending on the acceleration as well as on the speed of the driven shaft, the center of gravity of said weight being advanced in the direction of forward motion as compared with the axis of said weight, and spring means operatively connected with said weight.

6. In an automatic transmission, a driving member and a coaxial driven member, a planet carrier forming part of the driven member, planetary gearing for operatively connecting said members, said planetary gearing comprising gears concentric with said members and planetary gears mounted in said planet carrier, a centrifugal weight pivoted in the planet carrier on an axis parallel to the axis of said members, spring means for drawing said weight towards the axis of said members, and means for locking said planetary gearing, said means being operatively connected with said weight.

7. In an automatic transmission, a planet carrier, a driving member and a driven member, planetary gearing for operatively connecting said members, said planetary gearing comprising gears concentric with said driven member and planetary gears mounted in said planet carrier, a centrifugal weight pivoted in the planet carrier coaxially with a planetary gear, the center of gravity of said weight being angularly advanced in the direction of forward motion as compared with the axis of said weight, and a friction clutch for locking said planetary gearing, said friction clutch being operatively connected with said weight.

8. In an automatic transmission for automotive vehicles, a driving member and a coaxial driven member, a planet carrier forming part of the driven member, planetary gearing for operatively connecting said members, said planetary gearing comprising gears concentric with said members and planetary gears mounted in said planet carrier, a centrifugal weight pivoted in said planet carrier, said weight being suited to swing between an inner and an outer end position, spring means for continuously drawing said weight towards the transmission axis, the arrangement being such that equilibrium between the spring force and the centrifugal force acting upon said weight is effected only in said inner and in said outer end position, the center of gravity of said weight being advanced in the direction of forward motion as compared with the axis of said weight, and a friction clutch for locking said planetary gearing, said friction clutch being operatively connected with said weight.

9. In an automatic transmission for automotive vehicles, a driving member and a coaxial driven member, a planet carrier forming part of the driven member, planetary gearing for operatively connecting said members, said planetary gearing comprising planetary gears mounted in said planet carrier and gears including an internal orbit gear concentric with said driven member, a centrifugal weight pivoted in said planet carrier on an axis substantially parallel to the axis of said driven member, said weight being suited to swing between an inner and an outer end position, a tension spring for continuously drawing said weight towards the transmission center, the arrangement being such that equilibrium is effected only in said inner and said outer end position and that the weight is sensitive to acceleration in the same manner as it is sensitive to high speed, and a friction clutch for locking said planetary gearing, said friction clutch being operatively connected with said weight.

10. In an automatic transmission for automotive vehicles, a driving member and a driven member, a planet carrier, planetary gearing for operatively connecting said members, said planetary gearing comprising gears concentric with said driven member and planetary gears mounted in said planet carrier, a centrifugal weight pivoted in said planet carrier, a tension spring for continuously drawing said weight towards the transmission center, said spring being so disposed that its center line is maintained substantially in a plane perpendicular to the transmission axis in all relative positions of said weight, and a friction clutch for locking said planetary gearing, said friction clutch being operatively connected with said weight.

11. In an automatic transmission for automotive vehicles, a driving member and a driven member, a planet carrier, planetary gearing for operatively connecting said members, said planetary gearing comprising gears concentric with said driven member and planetary gears mounted in said planet carrier, a centrifugal weight pivoted in said planet carrier, a spring for continuously drawing said weight towards the transmission center, the disposition being such that the leverage of said spring relatively to the axis of said weight decreases as the weight swings towards the outside, and a friction clutch for locking said planetary gearing, said friction clutch being operatively connected with said weight.

12. In an automatic transmission for automotive vehicles, a driving member and a coaxial driven member, a planet carrier forming part of the driven member, planetary gearing for operatively connecting said members, said planetary gearing comprising gears concentric with said members and planetary gears mounted in said planet carrier, means movable relatively to the planet carrier in a path extending angularly about the axis of said planet carrier and radially of said axis, so that said means are sensitive to acceleration and to speed of rotation, a friction clutch for locking said planetary gearing, said friction clutch being operatively connected with said means, a brake for maintaining a member of said planetary gearing stationary, and means for automatically operating said brake after disengagement of said friction clutch.

13. In an automatic transmission for automotive vehicles, a planetary train forming an operative connection between a driving member and a coaxial driven member, frictional means for locking said planetary train, controlling means for automatically operating said frictional means, spring means connected with said controlling means, and an operative connection between said controlling means and said members for making the positions of said controlling means dependent on the amount of torque transmitted.

14. In an automatic transmission for automotive vehicles, a gear train forming an operative connection between a driving member and a coaxial driven member, frictional means for effecting direct drive, controlling means for automatically operating said frictional means, spring means operatively connected with said controlling means, and an operative connection between said controlling means and said members for making the positions of said controlling means dependent on the amount of torque transmitted.

15. In an automatic transmission for automotive vehicles, means for transmitting torque at a changeable ratio from a driving member to a driven member, means for operating a change in said ratio, a control member for effecting automatic operation of the last named means, and two different operative connections between said control member and said torque transmitting means disposed in a manner to be effective one at a time depending on the direction of torque.

16. In an automatic transmission for automotive vehicles, means for transmitting torque at a changeable ratio from a driving member to a driven member, means for operating a change in said ratio, control means for effecting automatic operation of the last named means, said control means being movable relatively to said driven member in a path extending angularly about the axis of said driven member and radially of said axis, spring means in operative connection with said control means, and an operative connection between said control means and said means for transmitting torque, so that the speed of rotation, the acceleration and the torque transmitted affect the position of said control means.

17. In an automatic transmission for automotive vehicles, means for transmitting torque at a changeable ratio from a driving member to a driven member, means for operating a change in said ratio, a centrifugal weight pivoted on an axis substantially parallel to the axis of said driven member for controlling the last said means, spring means connected with said weight, and an operative connection between said weight and said torque transmitting means, so that the position of said centrifugal weight depends on the amount of torque transmitted.

18. In an automatic transmission for automotive vehicles, means for transmitting torque at a changeable ratio from a driving member to a driven member, means for effecting a change in said ratio, a centrifugal weight for controlling the last said means, springs means connected with said weight, an operative connection between said weight and said torque transmitting means so that the position of said weight depends on the speed and on the amount of torque transmitted to the driven member.

19. In an automatic transmission for automotive vehicles, constant mesh gears for transmitting torque from a driving member to a driven member at a plurality of different ratios, clutching means for establishing one of said ratios, a plurality of weights mounted on axes parallel to the main axis of the transmission, said weights being suited to swing between an inward and an outward end position and having their centers of gravity advanced in the direction of forward motion as compared with their respective axes, means for operatively interconnecting said weights in a positive manner, and means for governing said clutching means with said weights.

20. In an automatic transmission for automotive vehicles, means for transmitting torque at a changeable ratio from a driving member to a coaxial driven member, means for changing said ratio, a member movable relatively to either of said members and operatively connected with said members, governing means mounted on said movable member for controlling changes of said ratio, and an operative connection between said governing means and said driven member.

21. In an automatic transmission for automotive vehicles, a drive shaft and a coaxial driven shaft, a planet carrier, a planetary train forming an operative connection between the drive shaft and the driven shaft, said planetary train comprising gears concentric with said shafts and planets mounted in said planet carrier, means for changing the ratio between the drive shaft and the driven shaft, governing means for governing changes of said ratio, said governing means being mounted on said planet carrier, and a gear connection between said governing means and said driven shaft.

22. In an automatic transmission for automotive vehicles, means for transmitting torque at a changeable ratio from a driving member to a driven member, means for changing said ratio, a plurality of centrifugal weights for controlling the means for changing said ratio, and spring means for operatively connecting said weights with said means for changing said ratio.

23. In an automotive transmission, a driving member and a driven member, a planet carrier, a planetary train for operatively connecting said driving member and said driven member at a plurality of different ratios, said planetary train comprising gears coaxial with said driven member and planets mounted in said planet carrier, means for automatically changing the ratio between said driving member and said driven member, another planetary train for operatively connecting said driving member and said driven member at ratios different from the above said ratios, said other planetary train comprising gears coaxial with said driven member and planets mounted in the above said planet carrier, and a hand control for exclusively controlling operation of said other planetary train.

24. In an automotive transmission, a driving member and a driven member, a planet carrier, a planetary train for operatively connecting said driving member and said driven member at a plurality of different ratios, said planetary train comprising gears coaxial with said driven member and planets mounted in said planet carrier, means for automatically changing the ratio between said driving member and said driven member, another planetary train for operatively connecting said driving member and said driven member at ratios different from the above said ratios, said other planetary train comprising gears coaxial with said driven member and planets mounted in the above said planet carrier, a hand control for exclusively controlling operation of said other planetary train, and means for locking said means for automatically changing the ratio during operation of said other planetary train.

25. In a planetary automotive transmission, change speed means, governing means for automatically controlling operation of only a part of said change speed means, a lever movable in two planes angularly disposed to each other for controlling operation of said change speed means by hand, motion of said lever in one plane corresponding to control of the above said part of said change speed means, and motion of said lever in the other of said planes corresponding to operation of the remainder of said change speed means, and means for automatically locking said governing means during operation of said remainder.

ERNEST WILDHABER.